J. A. SNEE.
APPARATUS FOR PRODUCING CARBON BLACK.
APPLICATION FILED SEPT. 20, 1911.

1,036,363.

Patented Aug. 20, 1912.

2 SHEETS—SHEET 1.

WITNESSES

INVENTOR

J. A. SNEE.
APPARATUS FOR PRODUCING CARBON BLACK.
APPLICATION FILED SEPT. 20, 1911.
1,036,363.
Patented Aug. 20, 1912.
2 SHEETS—SHEET 2.
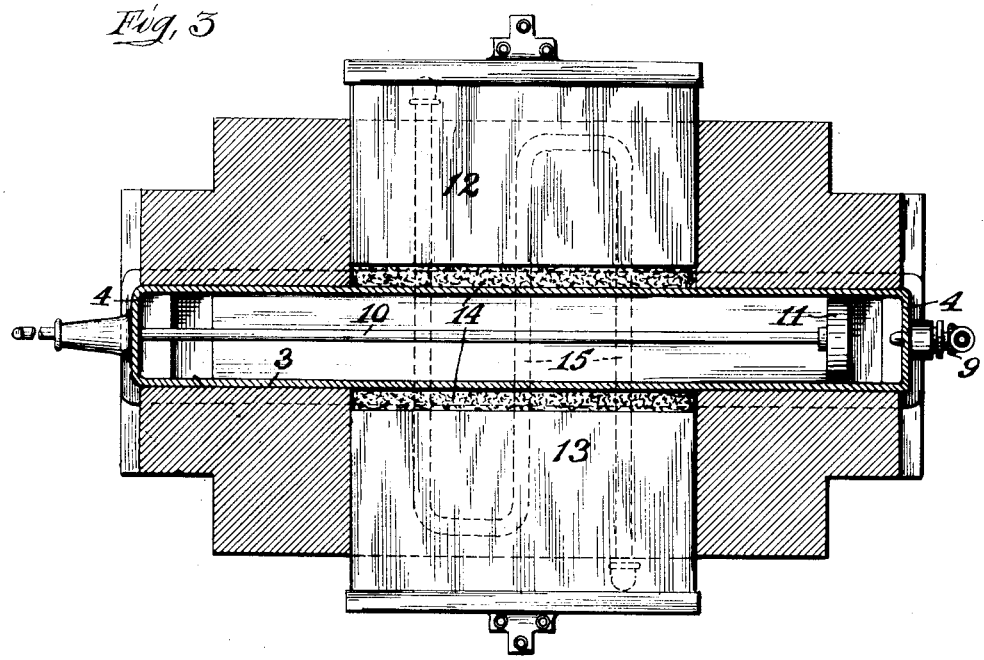
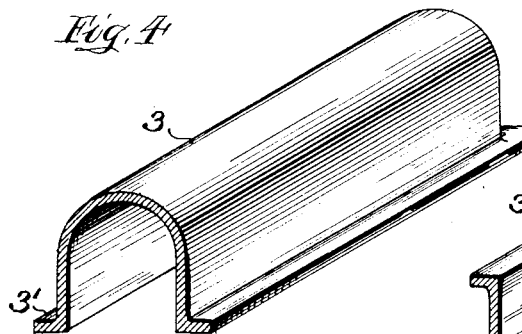
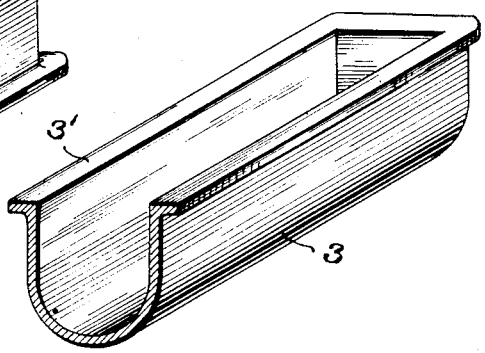

UNITED STATES PATENT OFFICE.

JOHN A. SNEE, OF WEST ELIZABETH, PENNSYLVANIA.

APPARATUS FOR PRODUCING CARBON-BLACK.

1,036,363.     Specification of Letters Patent.     Patented Aug. 20, 1912.

Application filed September 20, 1911. Serial No. 650,445.

*To all whom it may concern:*

Be it known that I, JOHN A. SNEE, a resident of West Elizabeth, in the county of Allegheny and State of Pennsylvania, have invented certain new and useful Improvements in Apparatus for Producing Carbon-Black, of which the following is a specification.

This invention relates to the production of carbon or lamp black from hydrocarbon gas, as fully set forth hereinafter.

If the carbon black is permitted to remain in the presence of the heat necessary to recover all of it, it will coke or deteriorate, detracting greatly from its commercial value and impeding the operation of the decomposing apparatus. Heat of great intensity is necessary to thus completely decompose the gas, and as the coking tendency is greater in higher than in lower temperatures, I have had to deal at once with the provision of a high heat and the prevention of deterioration. Hence, one object herein is to provide for subjecting the material to the influence of a lower temperature while within the decomposing zone, this being accomplished by maintaining the floor or bottom surface of the chamber at lower temperature than that portion above the floor, so that the carbon black settles thereon immediately upon being formed, and from which it may be removed with reasonable deliberation unimpaired. The high heat utilized in recovering substantially all the carbon black has the further effect of fully calcining the product, so that the subsequent and separate calcining process now usually necessary in producing high grade carbon black is avoided.

Figure 1:
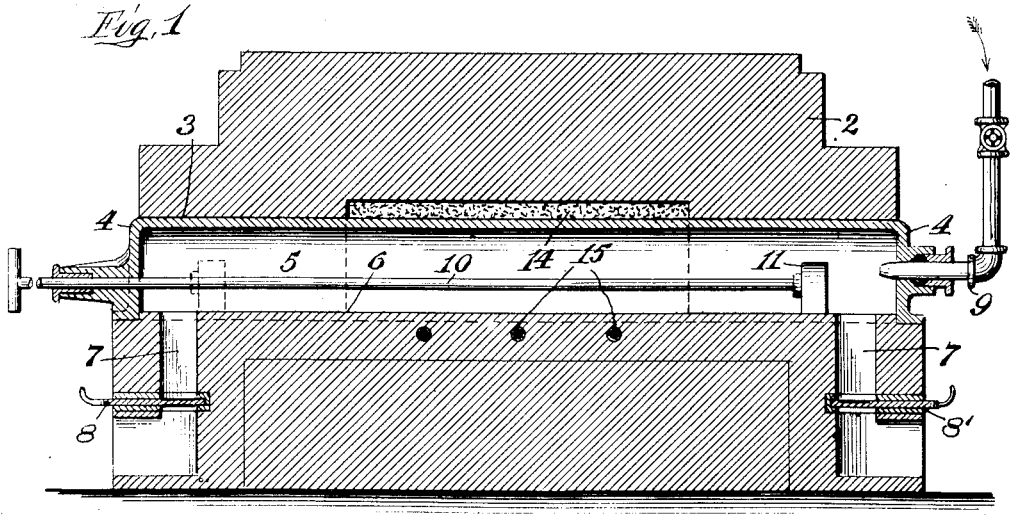
Figure 2:
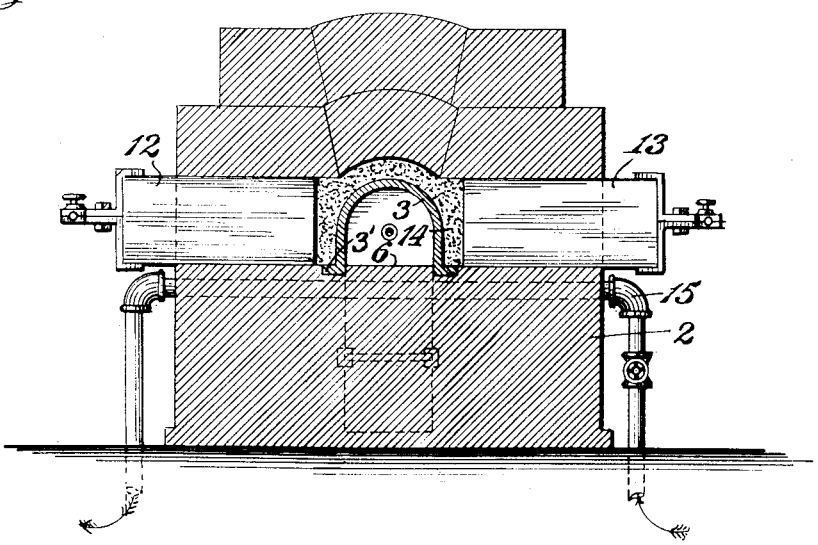

A desirable form of apparatus for practising the invention is illustrated by the accompanying drawings, Figure 1 being a central longitudinal section of the same; Fig. 2 a vertical cross section, and Fig. 3 a sectional plan. Figs. 4 and 5 are sectional details of the refractory arch.

Referring to the drawings, 2 designates a furnace structure of brick or other material in which is incased the upright hollow arch 3, with the ends 4 thereof closed. The arch is constructed of a highly refractory material, such as alundum, and is preferably formed with no bottom, the decomposing chamber or retort 5 inclosed by the arch having its bottom surface 5 preferably formed of the material of the furnace structure. Opening downwardly from opposite ends of arch 3 are the flue-like outlets 7, controlled by valves or dampers 8, 8', respectively. The valved hydrocarbon gas inlet 9 is entered through one of the arch ends 4, while operating through the opposite end of the arch is rod 10 to which is secured a scraper 11 for scraping the carbon black from the bottom surface 6 into one or the other of the valved outlets 7.

For heating the retort I employ two electrodes 12 and 13 to which the terminals of a suitable electric circuit are connected. These electrodes are entered through recesses at opposite sides of the furnace structure 2, and are elongated in the direction of the length of the arch in order to heat a sufficiently large area of the latter, the electrodes being relatively thin or narrow vertically. The extremities of the electrodes are spaced from arch 3 by a narrow layer of high resistance material 14, preferably broken carbon, which extends upwardly around the arch from its base flanges 3″. With the requisite amperage this resistance material brings the arch 3 to a white heat which may range from 1,300 to 1,800 degrees centigrade, although I prefer the temperature approximating that last mentioned the same may range downwardly to the lower temperature indicated, or even lower, and yet result in practically full decomposition so far as dissociating the carbon is concerned.

As surface 6 is not directly heated its temperature is materially lower than the zone of which it forms the bottom, so that as the carbon black is formed and settles thereon the tendency of certain tarry substances contained in the carbon to decompose is immediately forestalled, and cementing which causes coking is prevented.

While the construction of the retort and the mode of heating are such that the retort bottom is maintained at lower temperature than the decomposing zone immediately above the bottom, I have provided for still further reducing the temperature of the bottom by embedding therein a pipe coil 15 through which water may circulate.

Damper 8 is opened sufficiently to permit the products to escape without accumulating pressure within the retort so that the decomposing process proceeds at substantially atmospheric pressure, this regardless of the head of pressure of gas admitted through inlet 9, which may be a few ounces or much greater, as desired.

While I prefer to heat the retort electrically and by the arrangement and location of the electrodes shown and described, I do not confine myself to such heating means, nor in fact to the use of electricity as the heating medium.

I claim:—

1. Apparatus for producing carbon black comprising a retort having a bottom surface for receiving the carbon black resulting from decomposing a hydrocarbon, and means for maintaining the upper portion of the retort at higher temperature than its bottom surface.

2. Apparatus for producing carbon black comprising a retort having a valved exit, a hydrocarbon inlet for the retort, the bottom of the retort forming a surface on which the carbon black is deposited following the decomposing process, and means for heating that portion of the retort above said surface to a higher temperature than said surface.

3. Apparatus for producing carbon black comprising a retort having a bottom surface for receiving the carbon black, a hydrocarbon inlet for the retort, and electrical heating means applied to heat the retort above its bottom to a higher degree than its bottom.

4. Apparatus for producing carbon black comprising a retort having a bottom surface for receiving carbon black resulting from decomposing a hydrocarbon, an arch of refractory material forming top and side walls for the retort, and means for heating said arch to a higher degree than said bottom surface.

5. Apparatus for producing carbon black comprising a retort having a bottom surface for receiving carbon black resulting from decomposing a hydrocarbon, and electrical heating means applied to heat the retort above its bottom to a higher degree than its bottom.

6. Apparatus for producing carbon black comprising a retort having a bottom surface for receiving carbon black resulting from decomposing a hydrocarbon, the retort having side and top walls of refractory material, high resistance material bearing against the exterior of said top and side walls, and electrodes connected to said resistance material at opposite sides of the retort.

7. Apparatus for producing carbon black comprising a furnace structure having a horizontal surface which provides a retort bottom, a bottomless arch of refractory material above said surface, electrodes entered in the furnace structure at opposite sides thereof, and carbon extending around the arch and connecting the electrodes.

In testimony whereof I affix my signature in presence of two witnesses.

JOHN A. SNEE.

Witnesses:
GUSTAVE FERNIKES,
J. M. NESBIT.